United States Patent
Lutz

(10) Patent No.: US 12,153,407 B2
(45) Date of Patent: Nov. 26, 2024

(54) BACK ANNOTATION OF LOAD REDUCTION IN CLIENTS

(71) Applicant: Siemens Aktiengesellschaft, Munich (DE)

(72) Inventor: Benjamin Lutz, Pfinztal (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 101 days.

(21) Appl. No.: 17/575,784

(22) Filed: Jan. 14, 2022

(65) Prior Publication Data

US 2022/0229425 A1    Jul. 21, 2022

(30) Foreign Application Priority Data

Jan. 18, 2021   (EP) .................................. 21152061

(51) Int. Cl.
| | | |
|---|---|---|
| G05B 19/41 | (2006.01) | |
| G05B 19/418 | (2006.01) | |
| G06Q 50/04 | (2012.01) | |
| G05B 19/40 | (2006.01) | |

(52) U.S. Cl.
CPC ....... G05B 19/41865 (2013.01); G06Q 50/04 (2013.01); *G05B 2219/32085* (2013.01)

(58) Field of Classification Search
CPC .... G05B 19/41865; G05B 2219/32085; G05B 2219/31473; G05B 2219/31474; G05B 2219/35329; G05B 19/409; G05B 19/4185; G06Q 50/04
USPC ...................................................... 700/100
See application file for complete search history.

(56) References Cited

U.S. PATENT DOCUMENTS

| | | | | |
|---|---|---|---|---|
| 2008/0013462 | A1* | 1/2008 | Ye .......................... | H04L 43/00 370/252 |
| 2011/0197135 | A1 | 8/2011 | Kataoka et al. | |
| 2013/0021355 | A1* | 1/2013 | Ramarao ............ | G05B 23/0272 345/531 |
| 2013/0083042 | A1* | 4/2013 | Sagall ....................... | G06T 1/20 345/503 |

(Continued)

FOREIGN PATENT DOCUMENTS

| | | |
|---|---|---|
| CN | 108710347 | 10/2018 |
| CN | 110161941 | 8/2019 |

(Continued)

OTHER PUBLICATIONS

EP Search Report dated Jul. 20, 2021 based on EP21152061 filed Jan. 18, 2021.

*Primary Examiner* — Michael J Brown
(74) *Attorney, Agent, or Firm* — Cozen O'Connor

(57) ABSTRACT

A method for visual representation of a facility mimic diagram of a technical facility, in particular a process or manufacturing facility, which has an operator station server, an engineering station server and an operator station client, wherein a) a facility mimic diagram of the technical facility is transferred from the operator station server to the operator station client, b) visually limiting representation of the facility mimic diagram by the operator station client, and c) automatically notifying the engineering station server about the limitation of the visual representation of the facility mimic diagram set by the operator station client via a message.

20 Claims, 3 Drawing Sheets

(56) References Cited

U.S. PATENT DOCUMENTS

| | | | |
|---|---|---|---|
| 2015/0116335 A1* | 4/2015 | Chen | G09G 5/006 |
| | | | 345/520 |
| 2016/0335738 A1 | 11/2016 | Chen et al. | |
| 2017/0293993 A1* | 10/2017 | Achalla | G06F 8/38 |
| 2019/0259269 A1 | 8/2019 | Lutz et al. | |
| 2020/0028751 A1 | 1/2020 | Lutz et al. | |

FOREIGN PATENT DOCUMENTS

| | | |
|---|---|---|
| CN | 110730200 | 1/2020 |
| DE | 10053665 | 5/2002 |
| EP | 2354873 | 8/2011 |

* cited by examiner

BACK ANNOTATION OF LOAD REDUCTION IN CLIENTS

BACKGROUND OF THE INVENTION

1. Field of the Invention

The invention relates to a method for visual representation of a facility mimic diagram of a technical facility and a management system for a technical facility, in particular a process or manufacturing facility, which has an operator station server, an engineering station server and an operator station client, where for control and monitoring the operator station server is configured to transfer a facility mimic diagram of the technical facility to the operator station client, and where the operator station client is configured to limit the visual representation of the facility mimic diagram in cases of an anticipated overshoot of the duration available for a visual representation of the facility mimic diagram.

2. Description of the Related Art

Symbolic facility mimic diagrams are created for the control and monitoring of process-engineering facilities, which diagrams represent the process-engineering connections (particularly between the process objects) in an abstract manner. Facility mimic diagrams are composed of static symbols (such as pipes or rectangles), dynamized symbols (for example, as a function of process values, pipes with color change or rectangles with fill levels), block symbols (for dynamized visualization of process-engineering process objects), complex controls (for example, trend indicators or event sequence indicators) and containers, which can visualize contents of independent and stand-alone sources (for example, webcams, facility mimic diagrams of modular facility parts or apps such as controller optimizers).

The containers in facility mimic diagrams are implemented by different technologies. In current, web-oriented management systems, the implementation occurs, for example, by what are known as iFrames or based on the iFrame-based Siemens Web Application Collaboration (SWAC) technology. The above-mentioned complex controls (trend indicators, XY-graphs, event sequence indicators, step sequences and/or batch) are also embedded into facility mimic diagrams as a rule via containers because the underlying applications can thus be decoupled and distributed at the server to achieve a higher degree of robustness.

Modern facility mimic diagrams are thus heterogeneous because these facility mimic diagrams are not dynamized by a single application, but by many different applications, which can also be localized on different servers. This modularity is expedient and necessary for addressing demand of Internet 4.0 (flexible, modular and dynamically reconfigurable facilities), but the visualization of the heterogeneous facility mimic diagrams in operator station clients presents corresponding challenges, in particular in view of stability, reliability and performance of the operator station clients.

If a plurality of containers is embedded in a facility mimic diagram and the contents of a container, such as an event sequence indicator, requires more time for the rendering, then other containers, as well as the rest of the facility mimic diagram, are adversely affected. The problems resulting from this can be manifold: firstly "sluggish" dynamized facility mimic diagrams can occur. In addition, "frozen" and thus non-controllable facility mimic diagrams are possible. A "crashing" operator station client is also possible if the update requests back up and the operator station client crashes due to a lack of available memory.

In these particularly serious cases, control and monitoring of the process engineering facility thus stops—the facility is thus flying blind. Various methods for load reduction are known therefore in order to prevent overloading. Three methods for different diagram elements for the reduction in the rendering load should be cited as examples:

1) Reduction in the rendering load in the case of trend indicators:
   - a dynamically adaptive increase in the aggregation factor leads to a reduction in the points to be rendered for a trend curve
   - the trend is updated less frequently with new process values due to a dynamically adaptive increase in the update times (for example no longer every second, but every other second—or with every other rendering of the facility mimic diagram).
2) Reduction in the rendering load in the case of event sequence indicators:
   - the event sequence indicator is updated less frequently due to a dynamically adaptive increase in the update times (for example no longer every second but every other second—or with every other rendering of the facility mimic diagram)
3) Reduction in the rendering load in the case of webcam controls
   - a camera image for example is updated less frequently due to a dynamically adaptive increase in the image repetition frequency (for example no longer every second but every other second—or with every other rendering of the facility mimic diagram)

DE 100 536 65 A1, for example discloses conventional methods of the foregoing kind. Even if "total failure" of the control and monitoring can be averted by these methods, they still entail crucial disadvantages for the control and monitoring of a technical facility (for example, a process facility). For example, shorter update times of facility mimic diagrams and the loss of itemizations in trend indicators and the like are associated with the known methods.

If a facility mimic diagram is configured such that it basically threatens to overload the operator station client, it is often difficult, moreover, for an operator to recognize that load reductions were applied and that the facility mimic diagram actually had a different appearance. It is also not immediately obvious to an operator which diagram elements have resulted in the load reductions having been activated. He cannot order modifications of the facility mimic diagram either therefore, so, in future, load reductions are no longer necessary. It is thus difficult to appropriately optimize conspicuous facility mimic diagrams, so control and monitoring can take place without limitation.

On the other hand, it is currently not possible to already parameterize the facility mimic diagrams in advance, i.e., the project planning of automation of a technical facility, such that it does not result in load problems in the (operator station) clients. This is primarily due to the fact that it is not just the contents of the facility mimic diagrams, but also the hardware on which the facility mimic diagram is visualized, which is decisive for a trouble-free visualization of the facility mimic diagrams. Additionally, a large number of different types of hardware can be used as a client specifically when a web-based management system is used.

SUMMARY OF THE INVENTION

In view of the foregoing, it is an object of the invention to provide a management system for a technical facility, which can represent facility mimic diagrams of the technical facility with a high level of availability.

This and other objects and advantages are achieved in accordance with the invention by a management system for a technical facility, in particular a manufacturing or process facility, by use of the management system for operation the technical facility and by a method for visual representation of a facility mimic diagram of the technical facility, where the management system has (at least) one operator station server, an engineering station server and an operator station client. For control and monitoring, the operator station server is configured to transfer a facility mimic diagram of the technical facility, previously generated by the engineering station server, to the operator station client. In addition, the operator station client is configured to limit the visual representation of the facility mimic diagram in cases of an anticipated overshoot of the duration available for a visual representation of the facility mimic diagram. In accordance with the invention, the operator station client of the management system is configured to automatically inform the engineering station server about the limitation of the visual representation of the facility mimic diagram via a message.

In the present context, a management system means a computer-assisted technical system, which comprises functionalities for representing, controlling and managing a technical system such as a manufacturing or production facility. Apart from the operator station server, the operator station client and the engineering station server, the management system can also comprise, for example, what are known as process- or manufacturing-related components, which serve to actuate actuators or sensors.

The technical facility can be a facility from the process industry, such as a chemical, pharmaceutical, petrochemical facility or a facility from the foodstuffs and luxury food industries. Also incorporated herewith are any facilities from the production industry, factories in which, for example, cars or goods of all kinds are produced. Technical facilities, which are suitable for implementing the inventive method, can also come from the energy production sector. Wind turbines, solar facilities or power stations for energy productions are likewise incorporated by the term technical facility.

In the present case, an "operator station server" means a server, which centrally captures data from a control and monitoring system and, as a rule, alarm and measured value archives of a management system of a technical facility and makes it available to users. As a rule, the operator station server establishes a communications link to automation systems (such as an automation device) of the technical facility and passes data from the technical facility to what are known as "operator station clients", which serve to control and monitor the operation of the individual functional components of the technical facility.

The operator station server can itself have client functions in order to access the data (archives, messages, tags, variables) of other operator station servers. As a result, diagrams of operation of the technical facility on the operator station server can be combined with variables of other operator station servers (server-server communication). The operator station server can be, without being limited hereto, a SIMATIC PCS 7 Industrial Workstation Server belonging to SIEMENS.

In the present case, an "engineering station server" means a server, which is configured to create, manage, archive and document different hardware and software projects for a management system of a technical facility. An interaction of control devices and equipment of the technical facility can be planned and managed with the aid of specific software design tools (engineering toolset) and prefabricated modules and plans by means of the engineering station server. Reference is also made to "engineering" or "project planning" of the automation of the technical facility. An example of such an engineering station server is a SIMATIC Manager Server belonging to SIEMENS.

The facility mimic diagram, which is generated on the engineering station and can be transferred from the operator station server to the operator station client for visual representation, is a control display conventionally used for management systems, which comprises graphic representations of individual elements of the technical facility and serves to represent a status of the individual elements, of a (for example, process-engineering) connection between the elements or the like.

The facility mimic diagram can comprise different diagram elements, such as an alarm signal indicator, connecting lines, controllers or graphic representations of technical objects of the technical facility. The alarm signal indicator can supply, for example, in a tabular list, an overview of alarm signals that have emerged in the management system and is also referred to as an event sequence indicator.

The operator station client is configured to limit the visual representation of the facility mimic diagram, if required. This serves to avoid an overload of the operator station client. The methods already previously explained and known per se can be used in this case.

If it sets such a limitation, the operator station client automatically informs the engineering station server of this via a message intended for this purpose. The project engineer of the technical facility, who has previously generated at least one facility mimic diagram (as a rule a large number of facility mimic diagrams) in the framework of project planning (engineering) of the automation of the technical facility via the engineering station server, can automatically receive feedback about potential overload problems of the operator station clients in the inventive management system. He can then purposefully adjust the project planning i to avoid overloading or limiting the visual representation of the facility mimic diagram. The inventive management system is therefore advantageously suitable to an increased extent for implementation on different hardware platforms, as are particularly employed when web-based management systems are used.

When transferring the facility mimic diagram, the operator station server can communicate to the operator station client the additional information as to which duration the operator station client is allowed to expend for the visual representation of the facility mimic diagram. In other words, it gives the operator station client a time budget that is available to the client to render the facility mimic diagram. This time budget can be previously defined in the engineering, i.e., when developing an automation of the technical facility.

If a new or updated facility mimic diagram (or a large number of facility mimic diagrams, or also just one new/updated diagram element of a facility mimic diagram already transferred to the operator station client) emerges in the management system, then the operator station server cannot immediately transfer it to the operator station client but must firstly send a message to the operator station client, which informs the client about the emergence of the new/updated facility mimic diagram. In response, the operator station client can calculate whether its time budget is sufficient for it to represent the new facility mimic diagram. For this, the operator station server checks whether the representation time for the visual representation of the new or updated facility mimic diagram would overshoot the duration, which the operator station client is allowed to expend for the visual representation of the facility mimic diagram.

If this is not the case, then the operator station client can retrieve the new/updated facility mimic diagram from the operator station server and visually represent it.

If the time budget would be overshot, then the operator station client, as stated previously, is configured to limit the visual representation of the facility mimic diagram. As a result, it can dynamically react to changing demands.

The message can comprise a reference to the facility mimic diagram. This can be a name and/or an identification (ID) of the facility mimic diagram. The project engineer thereby purposefully receives information about the facility mimic diagram potentially causing the overloading of the operator station client and can revise the project planning more efficiently. The message can also comprise fine-grained information, such as a type and/or an identification of a diagram element of the facility mimic diagram. The project engineer thereby receives not only the indication that a specific facility mimic diagram is affected but also which diagram element (for example, an event sequence indicator or a trend indicator) is the cause of the potential overloading of the operator station client.

Within the framework of an advantageous embodiment of the invention, the message comprises information about the operator station client, where the information particularly comprises a name, a type and/or a location of the operator station client, and/or an integration of the operator station client in a communications network of the technical facility. From this, the project engineer can derive, for example, whether only a particular type (of hardware) or a particular location of the operator station client (which enables, inter alia, only a slow communications link) is responsible for the potential overloading of the operator station client, or whether a fundamental problem possibly exists, which can affect a large number of operator station clients.

The message can also comprise an extent of the set limitation. If, for example, in the case of a trend indicator, a load reduction is performed via an increase in the aggregation, then the ratio between ideal aggregation and real aggregation can thus be used as an extent. For the ideal visual representation of a trend with 1,000 renderable points, for example, an aggregation of $1/10$ is calculated (10 measuring points are allocated to 1 measuring point, in order to be able to represent 1,000 measuring points). Depending on the operator station client, an aggregation of $1/12$, or $1/20$ is applied after a load reduction. The extent of the set limitation (here the increase in the aggregation) can provide the project engineer with information about the criticality of the overload problems of the operator station client. From this, he can, for example, prioritize messages that the project engineer should process.

The operator station server is preferably configured to store the message of the operator station client in a message archive such that the message can be retrieved by an operator and/or a project engineer of the management system. The operator hereby receives immediate feedback about an undertaken load reduction.

The message generated by the operator station client can be an alarm signal whose processing can be acknowledged by a project engineer and/or an operator of the management system. The project engineer can thus make use of the alarm management system that is normally available as standard in a management system in order to be able to easily identify possible problems in the visualization of a facility mimic diagram. The acknowledgement of the alarm signal by the project engineer indicates to an operator, as the user of the operator station client, that the project engineer has already dealt with/solved the problem of the potential overloading of the operator station client. In particular cases (if no revision of the project planning is necessary), it can also be expedient that the operator acknowledges the alarm signal.

The afore-worded object is also achieved by the use of a management system, which is configured in accordance with the disclosed embodiments for operation of a technical facility, in particular a process or manufacturing facility.

It is also an object of the invention, moreover, to provide a method for visual representation of a facility mimic diagram of a technical facility, in particular a process or manufacturing facility, which has an operator station server, an engineering station server and an operator station client. The method comprises a) transferring a facility mimic diagram of the technical facility from the operator station server to the operator station client, b) limiting visual representation of the facility mimic diagram by the operator station client, and c) automatically notifying the engineering station server about the limitation of the visual representation of the facility mimic diagram set by the operator station client via a message.

The message preferably comprises a reference to the facility mimic diagram.

Particularly preferably, the message comprises a type and/or an identification of a diagram element of the facility mimic diagram.

The message can comprise information about the operator station client, where the information particularly comprises a name, a type and/or a location of the operator station client, and/or an integration of the operator station clients in a communications network of the technical facility.

The message can also comprise an extent of the set limitation. The operator station server preferably stores the message of the operator station client in a message archive such that the message can be retrieved by an operator and/or a project engineer of the management system.

Particularly preferably, the message is an alarm signal whose processing can be acknowledged by a project engineer and/or an operator of the management system.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The above-described properties, features and advantages of this invention and the manner in which they are achieved will become clearer and more obvious in connection with the following description of an exemplary embodiment, which will be explained in more detail in connection with the drawings, in which.

DETAILED DESCRIPTION OF THE EXEMPLARY EMBODIMENTS

Figure 1:
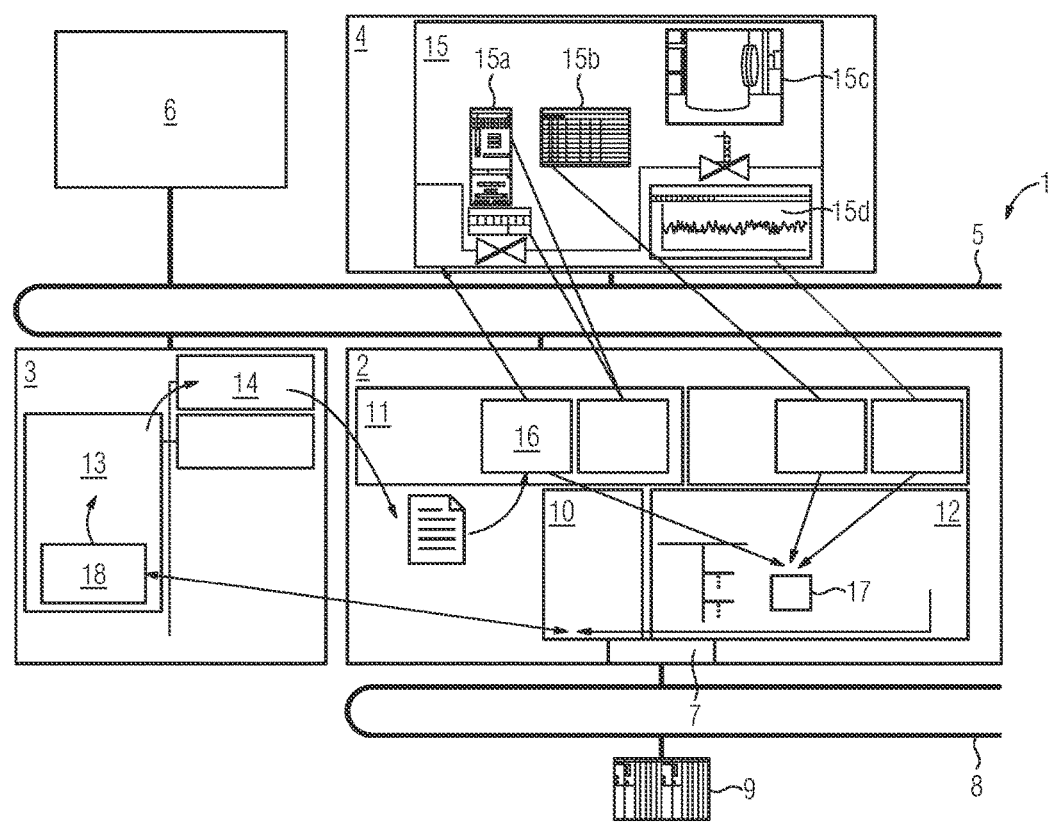
FIG. 1 shows a schematic illustration of a management system in accordance with the invention.

FIG. 1 illustrates part of an inventive management system 1 of a technical facility comprising a process facility, in other words as a process engineering facility. The management system 1 comprises an operator station server 2, an engineering station server 3, an engineering station client 6 and an operator station client 4.

The operator station server 2, the engineering station server 3, the engineering station client 6 and the operator station client 4 are interconnected via a terminal bus 5 and optionally connected to further components (not shown) of the management system 1 such as a process data archive.

A user or operator can access the operator station server 2 for the purpose of control and monitoring via the operator station client 4 over the terminal bus 5. A project engineer can access the engineering station server 3 via the engineering station client 6 over the terminal bus 5. The terminal bus 5 can be configured, for example, as an industrial Ethernet, without being limited thereto.

The operator station server 2 has a device interface 7, which is connected to a facility bus 8. The operator station server 2 can communicate via this device interface 7 with an automation device 9 and with optionally available further components of the process facility. The facility bus 8 can, without being limited thereto, be configured, for example, as an industrial Ethernet. The automation device 9 can be connected to any number of subsystems (not shown).

An alarm service 10, a visualization service 11 and a process map 12 are implemented on the operator station server 2. A design tool 13 and a compiling service 14 are implemented on the engineering station server 3.

The sequence of an inventive method is as follows: a project engineer creates a facility mimic diagram 15 with the aid of the design tool 13. The facility mimic diagram 15 is brought by the compiling service 14 into a format understandable to the operator station server 2 and is transferred by a facility mimic diagram service 16 of the operator station server 2 to the operator station client 4 such that the client visually represents the facility mimic diagram 15 for an operator of the management system 1. The facility mimic diagram 15 comprises a plurality of individual diagram elements 15a, 15b, 15c, 15d.

Owing to a potential overloading that it has recognized, the operator station client 4 represents the facility mimic diagram 15 to only a limited extent. In the process, the operator station client 4 can use the techniques of the prior art described in the introductory section of the instant disclosure. The operator station client 4 generates an alarm signal 17, which is stored by the alarm service 10 of the operator station server 2 in a message archive that forms a part of it. In addition, the alarm signal is transferred to a notation service 18 of the design tool 13. The project engineer can access the alarm signal 17 via the design tool and process this alarm signal. In the facility mimic diagram 15 affected by the alarm signal 17 and represented in the design tool 13, the diagram element 15a, 15b, 15c, 15d affected by the load problem is graphically highlighted (e.g., colored marking, or flashing animation). As a result, it is possible to efficiently show to the project engineer for which diagram element a load reduction was initiated. In addition, it is possible to show how often which operator station clients 3 set a limitation of the visual representation of the facility mimic diagram 15 and to what extent. Based on this information, the project engineer can then decide whether and how he optimizes the respective facility mimic diagram 15. After processing of the alarm signal 17, the project engineer can acknowledge this fact. The acknowledgement is then played back into the alarm service 10, such that the operator can take note of the acknowledgement.

Figure 2:
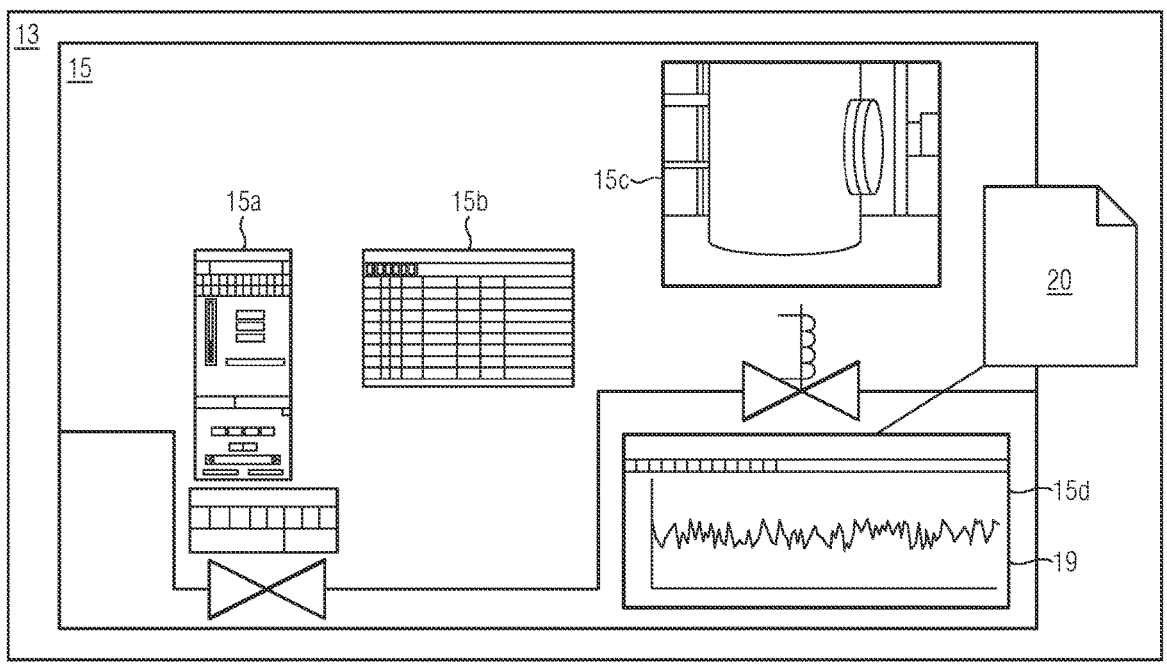
FIG. 2 shows a design tool implemented on an engineering station server of the management system of FIG. 1.

FIG. 2 shows the facility mimic diagram 1 with the individual diagram elements 15a, 15b, 15c, as is represented by the design tool 13. Based on the received alarm signal 17, the diagram element 15d bottom right in the facility mimic diagram 15 (a trend indicator of a process values) is highlighted in the opened facility mimic diagram 15 by a colored frame 19. For this diagram element 15d, the operator station client 4 has to apply a load reduction or limit the visual representation. Apart from the highlighting of the relevant diagram element 15d, a context 20 stored in the alarm signal 17 can also still be retrieved and represented in order to be able to assess whether a correction is also actually necessary.

If it can be inferred from the context, for example, that a load reduction of the trend indicator was applied equally in a plurality of operator station clients 4, then it is obvious that the project planning of the trend indicator should generally be corrected in order to prevent overloads, such as due to a reduction in the time domain or reduction in the curves. Thereafter, the revised facility mimic diagram 15 can be loaded on the operator station server 2 in a per se conventional manner.

If a load reduction was reported by only one operator station client, however, then no corrections are necessary, rather a check should be performed here to determine whether the operator station client 4 is limited in terms of its network connection, and/or its computing power.

The facility mimic diagrams 15 for control and monitoring can be iteratively improved by the inventive management system 1 and the associated methods respectively both during commissioning and during operation in order to be able to prevent limitations of the control and monitoring caused by load reductions.

Overall, the invention can make a contribution to a higher level of availability of the technical facility, specifically when a web-based management system 1 is used.

Figure 3:
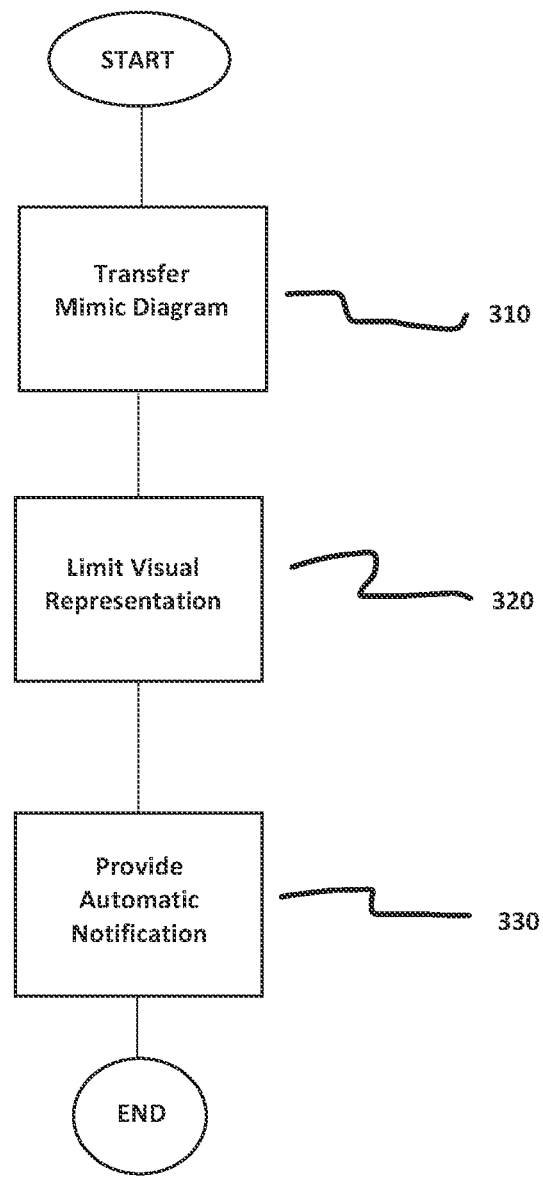
FIG. 3 is a flowchart of the method in accordance with the invention.

FIG. 3 is a flowchart of the method for visually representing a facility mimic diagram 15 of a technical facility which has an operator station server 2, an engineering station server 3 and an operator station client 4. The method comprises a) transferring a facility mimic diagram 15 of the technical facility from the operator station server 2 to the operator station client 4, as indicated in step 310.

Next, b) limited visual representation of the facility mimic diagram 15 by the operator station client 4 is provided, as indicated in step 320.

Next, c) the engineering station server 3 is automatically notified about the limitation of the visual representation of the facility mimic diagram 15 set by the operator station client 4 via a message 17, as indicated in step 330.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A management system for a technical facility, comprising:
    an operator station server operatively coupled to a facility bus and to a terminal bus;
    an engineering station server operatively coupled to the terminal bus; and
    an operator station client operatively coupled to the terminal bus, the operator station server, the engineering station server and the operator station client being interconnected via the terminal bus;
    wherein for control and monitoring the operator station server is configured to transfer a facility mimic diagram of the technical facility, previously generated by the engineering station server, to the operator station client;
    wherein the operator station client is configured to limit a duration of time in which a visual representation of the facility mimic diagram is displayable in cases of an anticipated overshooting of a duration of time available for the visual representation of the facility mimic diagram; and
    wherein the operator station client is further configured to automatically inform the engineering station server about the limitation of the visual representation of the facility mimic diagram via a message during operation of the technical facility, the facility mimic diagram being adjusted based on the message to avoid overly limiting the visual representation of the facility mimic diagram.

2. The management system as claimed in claim 1, wherein the message comprises a reference to the facility mimic diagram.

3. The management system as claimed in claim 2, wherein the message comprises at least one of (i) a type and (ii) an identification of a diagram element of the facility mimic diagram.

4. The management system as claimed in claim 1, wherein the message comprises information about the operator station client; and wherein the information comprises at least one of (i) a name, (ii) at least one of a type and a location of the operator station client and (iii) an integration of the operator station client in a communications network of the technical facility.

5. The management system as claimed in claim 1, wherein the message comprises an extent of a set limitation.

6. The management system as claimed in claim 1, wherein the operator station server is further configured to store the message of the operator station client in a message archive such that the message is retrievable by an operator of the management system.

7. The management system as claimed in claim 1, wherein the message is an alarm signal whose processing can be acknowledged by at least one of (i) a project engineer and (ii) an operator of the management system.

8. The management system as claimed in claim 1, wherein the technical facility comprises a process or manufacturing facility.

9. The management system as claimed in claim 1, wherein the management system is utilized to operate the technical facility.

10. The management system as claimed in claim 9, wherein the technical facility comprises a process or manufacturing facility.

11. A method for visually representing a facility mimic diagram of a technical facility which has an operator station server operatively coupled to a facility bus and to a terminal bus, an engineering station server operatively coupled to the terminal bus and an operator station client operatively coupled to the terminal bus, the method comprising:
    a) transferring a facility mimic diagram of the technical facility from the operator station server to the operator station client;
    b) providing limited visual representation of the facility mimic diagram by the operator station client; and
    c) operating the technical facility and automatically notifying the engineering station server about limitation of the visual representation of the facility mimic diagram set by the operator station client via a message during operation of the technical facility and adjusting the facility mimic diagram based on the message to avoid overly limiting the visual representation of the facility mimic diagram;
        wherein the operator station server, the engineering station server and the operator station client are interconnected via the terminal bus; and
        wherein the operator station client is configured to limit a duration of time in which the visual representation of the facility mimic diagram is displayable in cases of an anticipated overshooting of a duration of time available for the visual representation of the facility mimic diagram.

12. The method as claimed in claim 11, wherein the message comprises a reference to the facility mimic diagram.

13. The method as claimed in claim 12, wherein the message comprises at least one of (i) a type and (ii) an identification of a diagram element of the facility mimic diagram.

14. The method as claimed in claim 12, wherein the message comprises information about the operator station client; and wherein the information comprises at least one of (i) a name, (ii) at least one of a type and a location of the operator station client and (iii) an integration of the operator station client in a communications network of the technical facility.

15. The method as claimed in claim 11, wherein the message comprises information about the operator station client; and wherein the information comprises at least one of (i) a name, (ii) at least one of a type and a location of the operator station client and (iii) an integration of the operator station client in a communications network of the technical facility.

16. The method as claimed in one of claim 15, wherein the message comprises information about the operator station client; and wherein the information comprises at least one of (i) a name, (ii) at least one of a type and a location of the operator station client and (iii) an integration of the operator station client in a communications network of the technical facility.

17. The method as claimed in claim 11, wherein the message comprises an extent of a set limitation.

18. The method as claimed in claim 11, wherein the operator station server stores the message of the operator station client in a message archive such that the message is retrievable by at least one of (i) an operator and (ii) a project engineer of the management system.

19. The method as claimed in claim 11, wherein the message is an alarm signal whose processing can be acknowledged by a at least one of (i) a project engineer and (ii) or an operator of the management system.

20. The method as claimed in claim 11, wherein the technical facility comprises a process or manufacturing facility.

\* \* \* \* \*